G. W. ROBINSON.
PULLEY.
APPLICATION FILED FEB. 16, 1910.

1,052,966.

Patented Feb. 11, 1913.

WITNESSES
Abm Reed
Wilfred Alderson.

INVENTOR
George Wheelhouse Robinson
Per John H. Walsh
attorney

UNITED STATES PATENT OFFICE.

GEORGE WHEELHOUSE ROBINSON, OF PORTALEGRE, PORTUGAL.

PULLEY.

1,052,966.  Specification of Letters Patent.  Patented Feb. 11, 1913.

Application filed February 16, 1910. Serial No. 544,299.

*To all whom it may concern:*

Be it known that I, GEORGE WHEELHOUSE ROBINSON, a subject of the King of Great Britain, residing at Portalegre, in the Kingdom of Portugal, have invented new and useful Improvements in Pulleys, of which the following is a specification.

My invention relates to an improved method of manufacturing cork bodies for pulleys and the like, and the objects of my invention are to produce a homogeneous composite body formed from layers of granulated cork, cork dust, cork shavings and the like, and to provide a cork body having a hard, yet resilient surface capable of withstanding great torsional strains and adapted to have an increased frictional grip, all as hereinafter more fully set forth and described in the accompanying specification and drawings.

Figure 1:
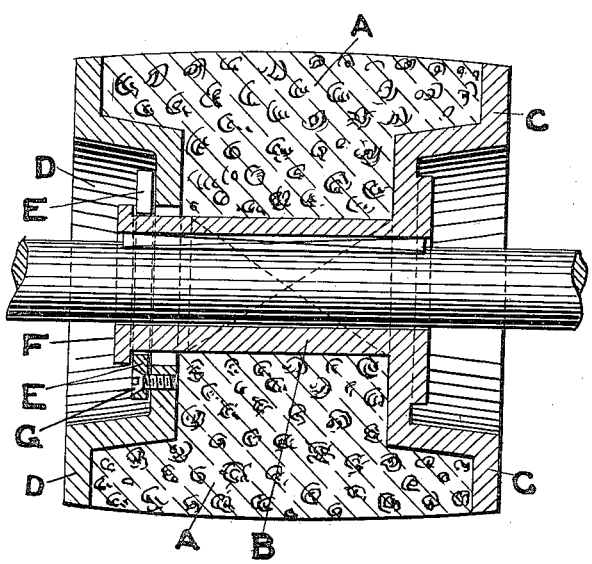
Figure 2:
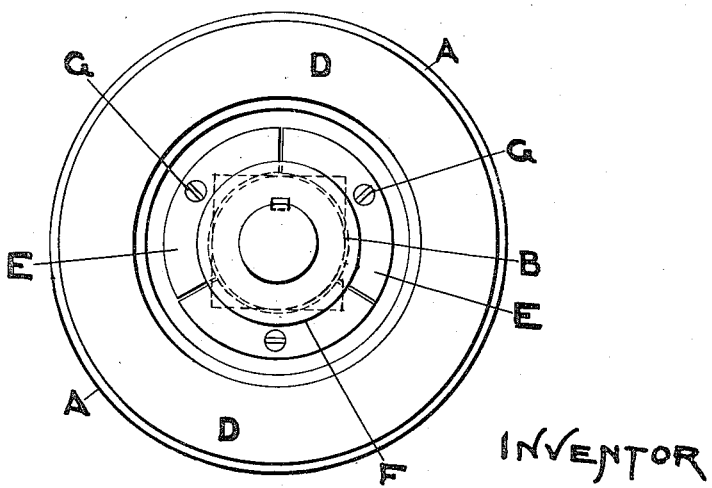

In the drawings: Figure 1 is a sectional elevation of a pulley manufactured from a cork body constructed in accordance with the present invention. Fig. 2 is an end elevation of the pulley shown in Fig. 1.

In accordance with the present invention, the material from which the cork body is formed, consists of a number of cork slabs, or layers of granulated cork, cork dust or cork shavings, subjected to a series of great pressures within a mold or frame for binding the whole into one solid or homogeneous mass of the desired shape. When the compressed cork body has acquired the desired length or bulk, the mold with its contents is removed from the press and placed within a suitably heated chamber or oven where the cork body is subjected to a temperature preferably approximating 600° Fahrenheit for a period of two hours, more or less according to the diameter of the body, and as circumstances require. It is then removed and preferably allowed to cool naturally.

The drawing illustrates a pulley embodying a block A, manufactured in accordance with the above described method. When cool, the said block A is fitted upon a suitable metal sleeve B forming part of a dished flange C. A similar loose flange D is placed upon the other end of the sleeve B, and is secured thereon by means of a segmental washer or ring E fitting between said flange D and a further flange F upon the sleeve B. To permanently hold the cork block or body rigidly upon the square or other suitably shaped sleeve B, the flange D is pressed down upon the cork until each of the loose segments of the washer or ring E can be fitted behind the flange F. When the pressure is taken off the flange D, the resiliency of the cork causes the washer E to be gripped and securely held between the flanges D and F. Screws G screwing into the flange D may be employed as a further security in holding the segmental washer in position. The heating of the cork block as before described following compression, fixes the latter, so that when turned up as shown in the drawings, a hard yet resilient surface is obtained capable of withstanding great torsional stresses. The peripheral friction or grip is greatly in excess of that of other forms of pulleys, so that pulleys of small diameter may be run at greater speed, and smaller belts employed without fear of slipping than has been possible hitherto.

In addition to constructing pulleys or drums for transmitting power of compressed cork, treated in the manner before described, I also similarly treat the blocks of compressed cork of which squeezing rollers are made, to fix the compression, so as to prevent re-action or expansion from contact with liquids of uniform or varying temperatures or influences. The degree of heat in addition to the period to which the cork block is submitted to such heat, may be varied as found suitable or necessary.

What I claim as my invention is:

A pulley comprising a cork body, a flat sided sleeve extending through the body having integral flanges at opposite ends, one of said flanges being of larger diameter and abutting one side of said body, a loose flanged ring abutting the opposite side of said body, a segmental washer surrounding the said sleeve and adapted to retain the loose flanged ring in position by being gripped between the latter and the lesser sleeve flange by the resilient cork body of the pulley.

In testimony whereof I have signed my name to this specification in the presence of two subscribing witnesses.

GEORGE WHEELHOUSE ROBINSON.

Witnesses:
VICTOR WHITAKER,
ALLAN MACFARLANE.